Patented June 19, 1934

1,963,074

UNITED STATES PATENT OFFICE 1,963,074

VINYLETHINYL CARBINOL POLYMERS AND PROCESSES FOR PREPARING SAME

Wallace H. Carothers, Fairville, Pa., and Gerard J. Berchet and Ralph A. Jacobson, Wilmington, Del., assignors to E. I. du Pont de Nemours & Company, Wilmington, Del., a corporation of Delaware No Drawing. Application November 11, 1931, Serial No. 574,358

20 Claims. (Cl. 260—2)

This invention relates to novel and useful polymers and it pertains specifically to polymers of vinylethinyl carbinols and to methods for preparing them.

In the copending application of Carothers and Berchet, Serial No. 574,456, filed November 11, 1931 there is described a method of preparing dimethyl vinylethinyl carbinol from monovinyl acetylene and acetone by means of the Grignard reaction, the equations being as follows:

$$CH_2=CH-C\equiv CH+CH_3MgBr \rightarrow CH_2=CH-C\equiv C-MgBr+CH_4$$
$$CH_2=CH-C\equiv C-MgBr+CH_3CO-CH_3 \rightarrow$$
$$CH_2=CH-C\equiv C-C(OMgBr)(CH_3)_2$$

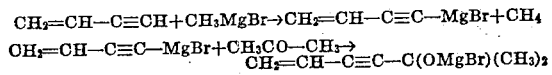

$$CH_2=CH-C\equiv C-C(OH)(CH_3)_2+MgBrOH$$

In the copending application of Carothers and Jacobson, Serial No. 574,359, filed November 11, 1931, is described a convenient method of preparing this carbinol from monovinyl acetylene and acetone by means of sodamide as the condensing agent, the reactions being as follows:

$$CH_2=CH-C\equiv CH+NaNH_2 \rightarrow CH_2=CH-C\equiv C-Na+NH_3$$
$$CH_2=CH-C\equiv CNa+CH_3COCH_3 \rightarrow$$
$$CH_2=CH-C\equiv C-C(ONa)(CH_3)_2$$

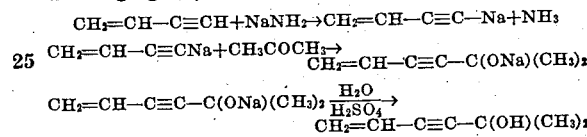

$$CH_2=CH-C\equiv C-C(OH)(CH_3)_2$$

These methods were extended to include aldehydes and ketones other than acetone and the following vinylethinyl carbinols were prepared and described; methyl ethyl vinylethinyl carbinol, diethyl vinylethinyl carbinol, dipropyl vinylethinyl carbinol, methyl octyl vinylethinyl carbinol, methyl vinylethinyl carbinol, propyl vinylethinyl carbinol, methyl phenyl vinylethinyl carbinol, diphenyl vinylethinyl carbinol, 1-cyclopentyl vinylethinyl carbinol, and 1-cyclohexyl vinylethinyl carbinol.

All of these carbinols have been found to polymerize readily, and although differing as to rate, they generally undergo the following transformations when subjected to polymerizing influences: (1) they progressively increase in viscosity becoming less and less mobile and finally nonmobile, the solids thus obtained being initially rubbery in nature; (2) the rubbery solids slowly change into hard, transparent, glass-like, insoluble resins. All of these resin-like polymers are new.

An object of the present invention relates to new resin-like polymers produced from vinylethinyl carbinols. A further object relates to different modes of preparing these polymers.

The polymerization of the vinylethinyl carbinols is readily effected by the presence of oxygen (air) and/or light. Thus if a vinylethinyl carbinol is exposed to the atmosphere in an open glass vessel, it will polymerize to a glass-like resin during a period of from several weeks to several months. The polymerization may be accelerated by the use of superatmospheric pressure, by the use of elevated temperature and by the use of suitable polymerization catalysts. The catalysts which are preferred for the polymerization of vinylethinyl carbinols belong to three classes. The first class includes metallic or metalloidal halides of elements of amphoteric or acid forming nature, such as the halides of zinc, iron, aluminum, antimony, bismuth, boron, and tin. A second class consists of oxidation accelerators such as benzoyl peroxide, acetyl peroxide, oxidized turpentine and other organic peroxides, ozone, hydrogen peroxide, and persalts, such as perborates, percarbonates, peruranates, permonosulfates, perchromates, which persalts are characterized by the atomic grouping OOM where M represents a metal. A third class of polymerization accelerators consists of accelerators of the photochemical polymerization effect and this class is exemplified by uranyl nitrate.

We have further found that the transformation from monomer to polymer can be controlled to produce polymers corresponding to two general types depending upon the method employed. The first type of polymer is a hard, transparent, glass-like and nearly colorless resin of slight solubility and limited fusibility. Polymers of this type are obtained preferably by the action of light upon the carbinol either with or without a polymerization catalyst such as benzoyl peroxide or uranyl nitrate. The second type of polymer is a brown, transparent resin, which in contrast to the polymer obtained by the action of light, is readily soluble and fusible. This polymer is preferably obtained by the action of heat either with or without a polymerization catalyst.

The light polymers can be prepared under a variety of conditions without affecting the essential character of the final products obtained. By suitable modifications in the method of preparation, the light polymers can be obtained in varying stages of polymerization ranging from the intermediate polymers, which are soluble in the common organic solvents to hard insoluble resins. The intermediate polymers are potentially reactive and can later be converted to the insoluble modification as needed. The advantages of these properties are obvious since the degree of solubility and fusibility can be adapted to conform to the application desired. Thus, the soluble intermediate polymers are suitable for use in coating compositions since in their intermediate condition they can be ground with pigments and mixed with other film-forming materials such as pyroxylin, and natural or synthetic resins. Coating compositions containing the intermediate polymers possess the property of drying very rapidly when applied to surfaces by the usual methods of dipping, brushing or spraying.

As described later, films have been prepared from the intermediate polymers which dry in one to one and a half hours at room temperature and still more rapidly at elevated temperatures. Solutions of the intermediate polymers are also adapted for such purposes as adhesives, and for the impregnation of paper or fabric. The more highly polymerized modifications are suitable for use in molding compositions.

The heat polymers can be prepared by heating the carbinol at various temperatures ranging up to their boiling points. Polymerization takes place more rapidly if benzoyl peroxide or an equivalent catalyst is added, or if air is bubbled through the liquid during the heating. The heat polymers can also be prepared directly in solution in such common organic solvents as toluene or the monoethyl ether of ethylene glycol, commonly sold under the trade-mark "Cellosolve". Under these conditions the monomeric carbinol is dissolved in the solvent and heated under a reflux condenser until the desired degree of polymerization is attained. The polymerization in solution likewise proceeds more rapidly if benzoyl peroxide or similar catalyst is added or if air is bubbled into the solution. After a few hours of heating, films prepared from the solutions are found to dry rapidly at room temperature. As in the case of the light polymers described above, varying degrees of polymerization can be obtained by varying the experimental conditions. The more highly polymerized products are obtained by increasing the time of heating and the temperature. The highly polymerized heat polymer is both soluble and fusible as distinguished from the completely polymerized light polymer which is both infusible and insoluble. The intermediate heat polymers are soluble in the ordinary organic solvents.

Since the intermediate and the more highly polymerized heat polymers are readily soluble in the common organic solvents, they can be ground with pigments and employed for coating compositions. Solutions of the intermediate polymers may also be employed for the impregnation of paper or fabric, or as adhesives. By mixing the intermediate polymer with wood-flour or other suitable fillers, molding compositions can be prepared. The preparation of both light and heat polymers is described below and the use of these products in coating compositions, molding compositions, and the like is illustrated by the following examples. It is to be understood that the methods of preparation can be varied over wide limits and that the examples recorded below are merely by way of illustration.

EXAMPLE I

*Preparation of insoluble light polymers from methyl ethyl vinylethinyl carbinol*

(a) Fifty grams freshly distilled methyl ethyl vinylethinyl carbinol containing one per cent benzoyl peroxide was exposed to a Cooper-Hewitt light. In 72 hours the product was a hard, transparent, pale-yellow, glass-like resin, comparatively infusible and having no appreciable solubility in organic solvents.

(b) Twenty-five grams methyl ethyl vinylethinyl carbinol containing one per cent benzoyl peroxide was exposed to a 150-watt Mazda light. In 4 days, a product similar to that described under (a) was obtained.

(c) Twenty-five grams methyl ethyl vinylethinyl carbinol containing one per cent uranyl nitrate was exposed to a Cooper-Hewitt light. In 72 hours, a hard transparent amber-colored resin was obtained.

(d) Twenty-five grams methyl ethyl vinylethinyl carbinol containing no catalyst was exposed to a Cooper-Hewitt light. After one week, a hard, transparent, pale-yellow resin was obtained.

The resins obtained in the above examples were unusually light in color. These hard insoluble, transparent products are suitable for machining, that is, they can be drilled, turned, planed, sawed, bored, or tapped. The monomeric carbinol can also be employed for the preparation of sheets, plates, rods and the like by casting it in properly shaped molds and subsequently polymerizing by light.

By interrupting the polymerization before the final hard polymers are formed, syrupy intermediate products are obtained which are useful as adhesives. A noteworthy property of the intermediate syrupy products is the fact that if they are applied to glass and the polymerization subsequently completed, the union between glass and polymer possesses remarkable strength and it is practically impossible to separate them. This represents a valuable property for the preparation of safety or non-shatterable glass. The following example illustrates the application of the syrupy intermediate polymers for the manufacture of non-shatterable glass.

EXAMPLE II

*Safety glass*

A sample of methyl ethyl vinylethinyl carbinol was exposed to a Mazda light for 24 hours. The syrupy product was applied to a glass plate as a film of uniform thickness and a second glass plate superimposed upon the first. Pressure was applied and the plates exposed to light until polymerization was complete. The plates of glass adhered very tenaciously. The syrupy intermediate polymers may also be used to bond sheets of cellulose derivatives to glass.

EXAMPLE III

*Preparation of a soluble light polymer from methyl ethyl vinylethinyl carbinol*

Four hundred grams of methyl ethyl vinylethinyl carbinol was dissolved in 400 g. toluene and 4 g. of powdered benzoyl peroxide added. The solution was exposed at room temperature to a Cooper-Hewitt light for 62 hours. At this stage the solution was still practically colorless but could not be diluted with toluene without separation of resin. No precipitation occurred, however, when the solution was diluted with alcohols, ketones, or esters. The toluene solution was used for the preparation of varnishes, lacquers, and enamels as described in Examples IV, V, and VI, and for the impregnation of paper and fabric as described in Examples VII and VIII.

Example IV

Clear varnish

Five parts of ethyl lactate was added to 120 parts of the above solution from Example III. The composition was therefore the following:

| | Parts |
|---|---|
| Methyl ethyl vinylethinyl carbinol light polymer | 60 |
| Toluene | 60 |
| Ethyl lactate | 5 |

This composition was then diluted with lacquer thinner to obtain suitable brushing or spraying viscosity. The clear varnishes dried in less than two hours at room temperature.

Example V

Lacquers (a) Thirty parts of the light polymer solution of Example III was mixed with 175 parts of lacquer thinner and 139 parts of pyroxylin base containing 21.6% nitrocellulose. The ratio of nitrocellulose to polymer was therefore 2:1, the formula being the following:

| | Parts |
|---|---|
| Methyl ethyl vinylethinyl carbinol light polymer | 15 |
| Toluene | 15 |
| Pyroxylin base containing 21.6% nitrocellulose | 139 |
| Lacquer thinner | 175 |

Films prepared from this lacquer dried in less than an hour at room temperature.

(b) Fifty parts of the light polymer solution of Example III was mixed with 100 parts of lacquer thinner and 57.8 parts of pyroxylin base containing 21.6% nitrocellulose. The ratio of nitrocellulose to polymer was therefore 1:2, the formula being the following:

| | Parts |
|---|---|
| Methyl ethyl vinylethinyl carbinol light polymer | 25 |
| Toluene | 25 |
| Pyroxylin base containing 21.6% nitrocellulose | 57.8 |
| Lacquer thinner | 100 |

Films prepared from this lacquer dried in less than one hour at room temperature.

Example VI

Enamels (a) One hundred parts of the light polymer solution of Example III was ground with 7.5 parts of carbon black in a ball mill for 45 hours.

| Mill base | Parts |
|---|---|
| Methyl ethyl vinylethinyl carbinol light polymer | 50 |
| Toluene | 50 |
| Carbon black | 7.5 |

The mill base was thinned to spraying viscosity with a mixture of equal parts of ethyl and butyl alcohols. Films of this enamel dried in 1.5 hours at room temperature.

(b) One hundred parts of the light polymer solution of Example III was ground with 70 parts of Titanox in a ball mill for 45 hours.

| Mill base | Parts |
|---|---|
| Methyl ethyl vinylethinyl carbinol light polymer | 50 |
| Toluene | 50 |
| Titanox | 70 |

The mill base was thinned to spraying viscosity with a mixture of ethyl and butyl alcohols. Films of this enamel dried in 1.5 hours at room temperature.

(c) One hundred parts of the light polymer solution of Example III was ground with 32.5 parts of chrome orange in a ball mill for 45 hours.

| Mill base | Parts |
|---|---|
| Methyl ethyl vinylethinyl carbinol light polymer | 50 |
| Toluene | 50 |
| Chrome orange | 32.5 |

The mill base was thinned to spraying viscosity with a mixture of ethyl and butyl alcohols. The enamel dried in 1.5 hours at room temperature.

Example VII

Impregnation of paper

The toluene solution of Example III containing soluble methyl ethyl vinylethinyl light polymer was diluted with half its volume of ethyl acetate. Paper was dipped into the solution and after allowing to drain for a short time, was suspended in a closed glass vessel and exposed to a Mazda light. By this procedure methyl ethyl vinylethinyl carbinol was polymerized both in the pores of the paper and on its surface. Hence, the method served as a means of simultaneous coating and impregnating paper of any desired quality.

Example VIII

Impregnation of fabric

The procedure described in Example VII was applied to a section of cotton fabric. Simultaneous coating and impregnation resulted.

Example IX

Preparation of a soluble heat polymer from methyl ethyl vinylethinyl carbinol Two hundred ninety-three grams of methyl ethyl vinylethinyl carbinol was dissolved in 293 g. "Cellosolve" and the solution gently refluxed for 10 hours. A slow stream of air was bubbled through the solution during the heating. At the end of 10 hours the solution had darkened somewhat and had increased considerably in viscosity. This solution was used for the preparation of varnishes, enamels and lacquers as described in the following examples, X, XI, and XII.

Example X

Clear varnish

One hundred fifty parts of the heat polymer solution of Example IX was mixed with 35 parts of teluene, the composition of the varnish thus being as follows:

| | Parts |
|---|---|
| Methyl ethyl vinylethinyl carbinol heat polymer | 75 |
| "Cellosolve" | 75 |
| Toluene | 35 |

Films of this varnish dried in 1.5 hours at room temperature.

Example XI

Lacquers (a) Thirty parts of the heat polymer solution of Example IX was mixed with 150 parts of lacquer thinner and 69.5 parts of pyroxylin base containing 21.6% nitrocellulose. The ratio of nitrocellulose to polymer was therefore 1:1, the formula being the following:

| | Parts |
|---|---|
| Methyl ethyl vinylethinyl carbinol heat polymer | 15 |
| "Cellosolve" | 15 |
| Pyroxylin base | 69.5 |
| Lacquer thinner | 150 |

(b) Eighty parts of the heat polymer solution of Example IX was mixed with 90 parts of lacquer thinner and 46.3 parts of pyroxylin base containing 21.6% nitrocellulose. The ratio of nitrocellulose to polymer was therefore 1:4, the formula being the following:

| | Parts |
|---|---|
| Methyl ethyl vinylethinyl carbinol heat polymer | 40 |
| "Cellosolve" | 40 |
| Pyroxylin base | 46.3 |
| Lacquer thinner | 90.0 |

EXAMPLE XII

Enamels (a) One hundred parts of the heat polymer solution of Example IX was ground with 70 parts of Titanox in a ball mill for 48 hours.

| Mill base | Parts |
|---|---|
| Methyl ethyl vinylethinyl carbinol heat polymer | 50 |
| "Cellosolve" | 50 |
| Titanox | 70 |

Films of this enamel dried in 1 to 1.5 hours at room temperature, and possessed good gloss, and excellent resistance to alkali.

(b) One hundred parts of the heat polymer solution of Example IX was ground with 7.5 parts of carbon black in a ball mill for 48 hours. Films of this enamel dried in 1 to 1.5 hours at room temperature and possessed good gloss.

EXAMPLE XIII

Molding composition

Molding compositions can best be prepared from the heat polymers, although the light polymers may also be employed if desired. Thus, the heat polymer solution of Example IX can be mixed with wood-flour or inorganic fillers and after removal of the solvent, the product can be molded by the application of heat and pressure. A more economical method consists in preparing the heat polymer in the absence of a solvent since the latter must subsequently be removed. Thus, methyl ethyl vinylethinyl carbinol was heated at 100° C. for 10 hours during which air was slowly bubbled into the carbinol. The plastic brown polymer was mixed with wood-flour in a Werner-Pfleiderer mixer. The molding composition contained the following ingredients:

| | Parts |
|---|---|
| Methyl ethyl vinylethinyl carbinol heat polymer | 100 |
| Wood-flour | 100 |
| Aluminum palmitate | 1 |
| Spirit-soluble nigrosine | 1 |

EXAMPLE XIV

Preparation of insoluble light polymers from dimethyl vinylethinyl carbinol

One hundred parts of dimethyl vinylethinyl carbinol containing one part of benzoyl peroxide was exposed to a Cooper-Hewitt light. At the end of 48 hours, the product was a hard, transparent, pale-yellow, glass-like resin.

EXAMPLE XV

Preparation of a soluble light polymer from dimethyl vinylethinyl carbinol

One hundred parts of dimethyl vinylethinyl carbinol was dissolved in 100 parts of toluene and 1 part of benzoyl peroxide added. The solution was exposed at room temperature to a Cooper-Hewitt light. At the end of 72 hours, the solution was still colorless but had somewhat increased in viscosity. In this condition, the solution was suitable for the preparation of coating compositions as illustrated in Examples IV, V, and VI, and for the impregnation of paper and fabric as illustrated in Examples VII and VIII.

EXAMPLE XVI

Preparation of a soluble heat polymer from dimethyl vinylethinyl carbinol (a) A solution of 100 parts of dimethyl vinylethinyl carbinol in 100 parts of "Cellosolve" was gently refluxed while a stream of air was bubbled into the solution. After three hours, films flowed from this solution dried in less than two hours. At the end of six hours the solution had darkened somewhat and increased in viscosity. Films from this solution dried very rapidly. This solution was suitable for the preparation of coating compositions as illustrated in Examples X, XI, and XII, and for the impregnation of paper and fabric.

It should be emphasized that the above examples merely set forth certain methods of carrying out the invention. It is obvious that modifications can be made in the methods of polymerization and also in the manner of formulating the pigmented products. Thus instead of employing a Cooper-Hewitt light for the light-polymerization of the vinylethinyl carbinols, other sources of light including sunlight may be employed. Instead of toluene, other organic solvents such as acetone, butyl acetate, diethylene glycol, etc., may be employed when the carbinols are polymerized in solution. Likewise in place of benzoyl peroxide or uranyl nitrate, other catalysts such as oxidized turpentine, inorganic peroxides, and stannic chloride may be substituted. The examples describe processes of light-polymerization at room temperature, but it is obvious that higher or lower temperatures may be used, depending upon the rate of polymerization desired. Inhibitors such as hydroquinone may be added to the partially polymerized carbinols for the purpose of decreasing the rate of subsequent polymerization or to prevent further polymerization, depending upon the amount of inhibitor which is added. Other inhibitors such as pyrogallol, catechol, p-phenylenediamine, phenyl-$\beta$-naphthylamine, etc., may be used.

Similarly, for the preparation of the soluble heat polymers, solvents other than "Cellosolve" or toluene may be used. Also, the polymerization can be carried out at higher or lower temperatures, and with or without the addition of catalysts such as benzoyl peroxide. Instead of air, oxygen may be bubbled into the solutions. The time of polymerization may vary considerably depending upon the temperature, solvent, presence or absence of catalyst, amount of air or oxygen employed and on other experimental conditions.

The effect of light and heat on the polymerization and on the character of the polymer has been particularly emphasized due to the great value of light and heat polymers. The scope of the invention, however, is intended to include vinylethinyl carbinol polymers however produced, and includes also the process of polymerization under all types of polymerizing influences, e. g., light, heat, pressure, oxygen, catalysts, etc.

For the application of the polymers in coating compositions, numerous modifications of the above examples are possible, depending upon the type of product desired. It is to be understood that the polymers can be employed with film-forming materials other than pyroxylin. Thus they may be incorporated with natural or synthetic resins, drying oils, cellulose acetate, ethyl cellulose, softeners, and the like. The polymers can be properly pigmented to obtain undercoats such as primers, surfacers, and putties.

The influence of pressure, oxygen, and catalysts on the polymerization of vinylethinyl carbinols is illustrated in the following example:

EXAMPLE XVII

Polymerization under pressure

A sample of methyl ethyl vinylethinyl carbinol was placed in a press and submitted to a pressure of 6,000 atmospheres at 50° C. for 76 hours. The carbinol polymerized to a pale yellow, transparent, non-elastic, resinous solid.

EXAMPLE XVIII

Polymerization in the presence of oxygen

A sample of methyl ethyl vinylethinyl carbinol was allowed to stand in a partially-filled bottle in which the air had been displaced by oxygen. In a few days the liquid had thickened considerably and after one week the product was a soft, plastic, sticky, pale yellow, transparent solid.

EXAMPLE XIX

Polymerization in the presence of a catalyst

A sample of dimethyl vinylethinyl carbinol was treated with one per cent of anhydrous stannic chloride. On standing for several days, a dark-brown, sticky, solid polymer was obtained.

Examples XVII to XIX are purely illustrative. Thus, any superatmospheric pressures may be used in lieu of that described in Example XVII, although pressures of several atmospheres are more effective than the lower pressures. Air may be used in place of oxygen, although its polymerizing effect is less than that of oxygen, due to its dilution with nitrogen.

The polymerization illustrated in Examples XVII to XIX proceeds through intermediate stages in which soluble and viscous polymers are produced. These soluble and viscous polymers are useful as coating, impregnating and molding compositions, according to the methods described above, in connection with the intermediate heat and light polymers. They may be mixed with suitable modifying agents, such as solvents, pigments, fillers, etc., according to the character of product desired.

The use of pressure during polymerization may be accompanied by the presence of catalysts, light, elevated temperature, or oxygen. Likewise, polymerization in the presence of oxygen or catalysts may be carried on in the presence of any other agents which influence polymerization.

Many modifications of the invention which depart from the description and illustrations outlined herein are possible. All such modifications which conform to the spirit of the invention are intended to be included within the scope of the claims.

We claim:

1. A polymer of a vinylethinyl carbinol.
2. A polymer of a vinylethinyl carbinol which contains a hydrocarbon radical attached to the carbinol group.
3. A polymer of a vinylethinyl carbinol which contains two hydrocarbon radicals attached to the carbinol group.
4. A polymer of a vinylethinyl carbinol which contains an aliphatic radical attached to the carbinol group.
5. A polymer of a vinylethinyl carbinol which contains two aliphatic radicals attached to the carbinol group.
6. A polymer of dimethyl vinylethinyl carbinol.
7. A polymer of methyl ethyl vinylethinyl carbinol.
8. A polymer of diethyl vinylethinyl carbinol.
9. A polymer of a vinylethinyl carbinol produced by polymerizing said carbinol under the influence of light.
10. A substantially insoluble and infusible resinous polymer of a vinylethinyl carbinol.
11. A fusible and soluble resinous polymer of a vinylethinyl carbinol.
12. An intermediate, incompletely polymerized polymer of a vinylethinyl carbinol.
13. A process which comprises polymerizing a vinylethinyl carbinol.
14. A process which comprises polymerizing a vinylethinyl carbinol in the presence of a polymerizing agent.
15. A process which comprises polymerizing a vinylethinyl carbinol in the presence of benzoyl peroxide.
16. A process which comprises polymerizing a vinylethinyl carbinol by the influence of heat.
17. A process which comprises polymerizing a vinylethinyl carbinol in the presence of light.
18. A process which comprises polymerizing a vinylethinyl carbinol under superatmospheric pressure.
19. A coating composition containing as one of its ingredients a soluble polymer of a vinylethinyl carbinol.
20. A molding composition containing a polymer of a vinylethinyl carbinol which has been polymerized to a point short of the infusible state.

WALLACE H. CAROTHERS.
GERARD J. BERCHET.
RALPH A. JACOBSON.